(12) United States Patent
Zou et al.

(10) Patent No.: US 11,894,880 B2
(45) Date of Patent: Feb. 6, 2024

(54) AUTOMATIC FINE-GRAINED RADIO MAP CONSTRUCTION AND ADAPTION

(71) Applicant: The Regents of the University of California, Oakland, CA (US)

(72) Inventors: Han Zou, Berkeley, CA (US); Costas J. Spanos, Lafayette, CA (US); Yuxun Zhou, Chicago, IL (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 415 days.

(21) Appl. No.: 17/312,803

(22) PCT Filed: Dec. 16, 2019

(86) PCT No.: PCT/US2019/066627
§ 371 (c)(1),
(2) Date: Jun. 10, 2021

(87) PCT Pub. No.: WO2020/124091
PCT Pub. Date: Jun. 18, 2020

(65) Prior Publication Data
US 2022/0077944 A1    Mar. 10, 2022

Related U.S. Application Data

(60) Provisional application No. 62/779,956, filed on Dec. 14, 2018.

(51) Int. Cl.
*H04B 17/318* (2015.01)
*H04B 17/21* (2015.01)
(Continued)

(52) U.S. Cl.
CPC .............. *H04B 17/318* (2015.01); *G06N 3/08* (2013.01); *H04B 17/21* (2015.01); *H04W 16/225* (2013.01)

(58) Field of Classification Search
None
See application file for complete search history.

(56) References Cited

U.S. PATENT DOCUMENTS

2019/0159159 A1*  5/2019  Murata .................. G01S 5/021
2020/0162341 A1*  5/2020  Vasseur ................. G06N 3/045

OTHER PUBLICATIONS

Abusara, A. et al., "Error Reduction in Distance Estimation of RSS Propagation Models Using Kalman Filters," Proceedings of the 2015 6th International Conference on Modeling, Simulation, and Applied Optimization (ICMSAO), May 27, 2015, Istanbul, Turkey, 5 pages.

(Continued)

*Primary Examiner* — Christine T Duong
(74) *Attorney, Agent, or Firm* — McCoy Russell LLP

(57) ABSTRACT

An automatic wireless fine-grained ratio map construction and adaptation system may include a Gaussian process regression (GPR) model constructed with real wireless received signal strength (RSS) measurements collected in a free space to provide coarse RSS estimation in a constrained space, and a generative adversarial network (GAN) to provide fine-grained RSS estimation in the constrained space by using an output of GPR as an input for a generator of GAN, modeling the irregular RSS distributions in complex indoor environments. The system may generate realistic RSS data in the constrained space that has not been manually site-surveyed.

20 Claims, 4 Drawing Sheets
(4 of 4 Drawing Sheet(s) Filed in Color)

(51) Int. Cl.
G06N 3/08 (2023.01)
H04W 16/22 (2009.01)

(56) References Cited

OTHER PUBLICATIONS

Zhang, C. et al., "ZipNet-GAN: Inferring Fine-grained Mobile Traffic Patterns via a Generative Adversarial Neural Network," Proceedings of the 13th International Conference on emerging Networking Experiments and Technologies (CoNEXT '17:), Dec. 12, 2017, Incheon Republic of Korea, 14 pages.
Iland, D. et al., "Rethinking GPS: Engineering Next-Gen Location at Uber," Uber Engineering Website, Available Online at https://eng.uber.com/rethinking-gps/, Apr. 19, 2018, 12 pages.
"How to get one-meter location-accuracy from Android devices (Google I/O '18)," YouTube Website, Available Online at https://www.youtube.com/watch?v=vywGgSrGODU, May 10, 2018, 4 pages.
"Introducing the Indoor Maps Program," Apple Developer Website, Available Online at https://developer.apple.com/videos/play/wwdc2019/245/, Available as Early as Jun. 22, 2019, 2 pages.
ISA United Stated Patent and Trademark Office, International Search Report Issued in Application No. PCT/US2019/066627, dated Mar. 18, 2020, WIPO, 2 pages.
ISA United Stated Patent and Trademark Office, Written Opinion of the International Searching Authority Issued in Application No. PCT/US2019/066627, dated Mar. 18, 2020, WIPO, 5 pages.

* cited by examiner

AUTOMATIC FINE-GRAINED RADIO MAP CONSTRUCTION AND ADAPTION

CROSS-REFERENCE TO RELATED APPLICATIONS

The present application is a U.S. National Phase of International Patent Application No. PCT/US2019/066627, entitled "AUTOMATIC FINE-GRAINED RADIO MAP CONSTRUCTION AND ADAPTION," filed on Dec. 16, 2019, which claims priority to U.S. Provisional Patent Application No. 62/779,956, entitled "AUTOMATIC FINE-GRAINED RADIO MAP CONSTRUCTION AND ADAPTION," filed Dec. 14, 2018. The entire contents of each of the above-identified applications are hereby incorporated by reference for all purposes.

BACKGROUND

The real-time position and mobility of a user are the most crucial information for personalized location-based services (LBSs) in the era of the Internet of Things (IoT). With the pervasiveness of mobile devices (MDs), people can enjoy satisfactory LBSs in outdoor environments in general by using the embedded Global Positioning System (GPS) module on MDs. However, the location estimates of GPS modules are inaccurate in densely populated and highly built-up urban areas.

Realizing equal levels of LBSs in indoor environments is still a challenging task since the performance of GPS modules degrade tremendously due to the lack of light of sight propagation channels. Various wireless sensing modalities, e.g., RFID, Bluetooth, and WiFi, have been proposed for indoor localization. With the pervasiveness and wide availability of WiFi infrastructure, and nearly every MD being equipped with a WiFi module, WiFi has been acknowledged as the most promising alternative to GPS for indoor LBSs.

The most promising algorithm for a WiFi-based indoor positioning system (IPS) is a fingerprinting-based algorithm. This consists of 2 steps: 1) in the offline training phase, receiving signal strength (RSS) measurements from multiple WiFi access points (APs) at numbers of reference calibration points (CPs) and collecting their coordinates and forming them as fingerprints to establish a radio and spatial mapping database over the indoor environment; and 2) in the online implementation phase, estimating the location of a MD by searching and matching the real-time RSS readings to the fingerprints stored in the database.

A key reason that a fingerprinting-based algorithm provides higher localization accuracy than a signal propagation model-based approach is that it captures the irregular signal variations in complex indoor environments. The quality of the offline radio map is vital for the localization performance of fingerprinting-based algorithms Thus, manual RSS data collection and site survey approaches are commonly adopted. However, constructing the radio map is extremely labor-intensive and time-consuming. In addition, the manually calibrated radio map at one time is vulnerable to temporal and environmental dynamics. These are two major bottlenecks that hinder WiFi-based IPS for ubiquitous indoor LBS implementation.

Various methods have been proposed to tackle these issues in recent years. For instance, researchers propose to automatically collect RSS measurements in a crowdsourcing manner when users are performing daily activities. A major drawback of crowdsourcing is the location uncertainties of the RSS data, which may lead to inaccurate spatial and radio mapping. Therefore, the localization accuracy of crowdsourcing method is usually lower than that of a fingerprinting-based algorithm with a manually calibrated radio map.

Another approach is to apply machine learning methods, e.g., manifold alignment and Gaussian process regression (GPR), to train a model with RSS data on a limited number of calibration points and generate interpolated RSS values on other locations for radio map construction. However, the scalability of GPR is poor and its representational power is restricted by the limited choice of kernel functions, e.g., squared exponential kernel. These functions are too smooth to mimic signal propagations in complex indoor environments that are severely affected by multipath effects caused by furniture, walls, and moving occupants.

Generative adversarial networks (GANs) can achieve huge successes in generative applications, especially in synthesizing realistic images in recent years. Thus, a tensor-GAN (TGAN) can be proposed to use GAN to generate high resolution representation of real RSS measurements at calibration points. However, this does not estimate RSS values at new coordinates and, therefore, does not enhance the spatial granularity of the radio map.

SUMMARY

The disclosed technology is generally directed to an automatic radio map construction and adaptation scheme to model the irregular Global Positioning System (GPS) signal distribution in these area for better location estimations. The automatic scheme may construct a fine-grained radio map over the entire area of interest. Implementations of the disclosed technology can include an automatic wireless fine-grained ratio map construction and adaptation scheme that is empowered by the designed Gaussian process regression (GPR) initialized Wasserstein generative adversarial network (GAN). In certain embodiments, any environment can be divided into two categories: a free space where a signal measurement sensor can access freely, and a constrained space the sensor cannot access or where the noise level of its measurement is high.

The disclosed system, referred to herein as WiGAN, may firstly establish a GPR model using the real RSS readings collected by the sensors in multiple calibration points in the free space. After that, the coarse RSS estimations from the GPR can be used as inputs for the generator of the GAN, and the generator and discriminator of the GAN can be trained in a minimum-maximum fashion. The discriminator may aim to identify whether the RSS data is real or synthesized, while the generator may construct realistic RSS data to fool the generator. In this manner, the irregular RSS distributions in complex environments can be modeled by inheriting the advantages of both the GPR and the GAN. To establish a radio map in constrained space without any real data collection procedure, the trained GPR model can be used to generate coarse RSS estimations at those virtual points within the constrained space. Then, by using them as the input for the GAN's generator, the fine-grained RSS values at points inside the area of interest can be estimated from the generator.

BRIEF DESCRIPTION OF THE DRAWINGS

The patent or application file contains at least one drawing executed in color. Copies of this patent or patent application publication with color drawings will be provided by the Office upon request and payment of the necessary fee.

DETAILED DESCRIPTION

Figure 1:
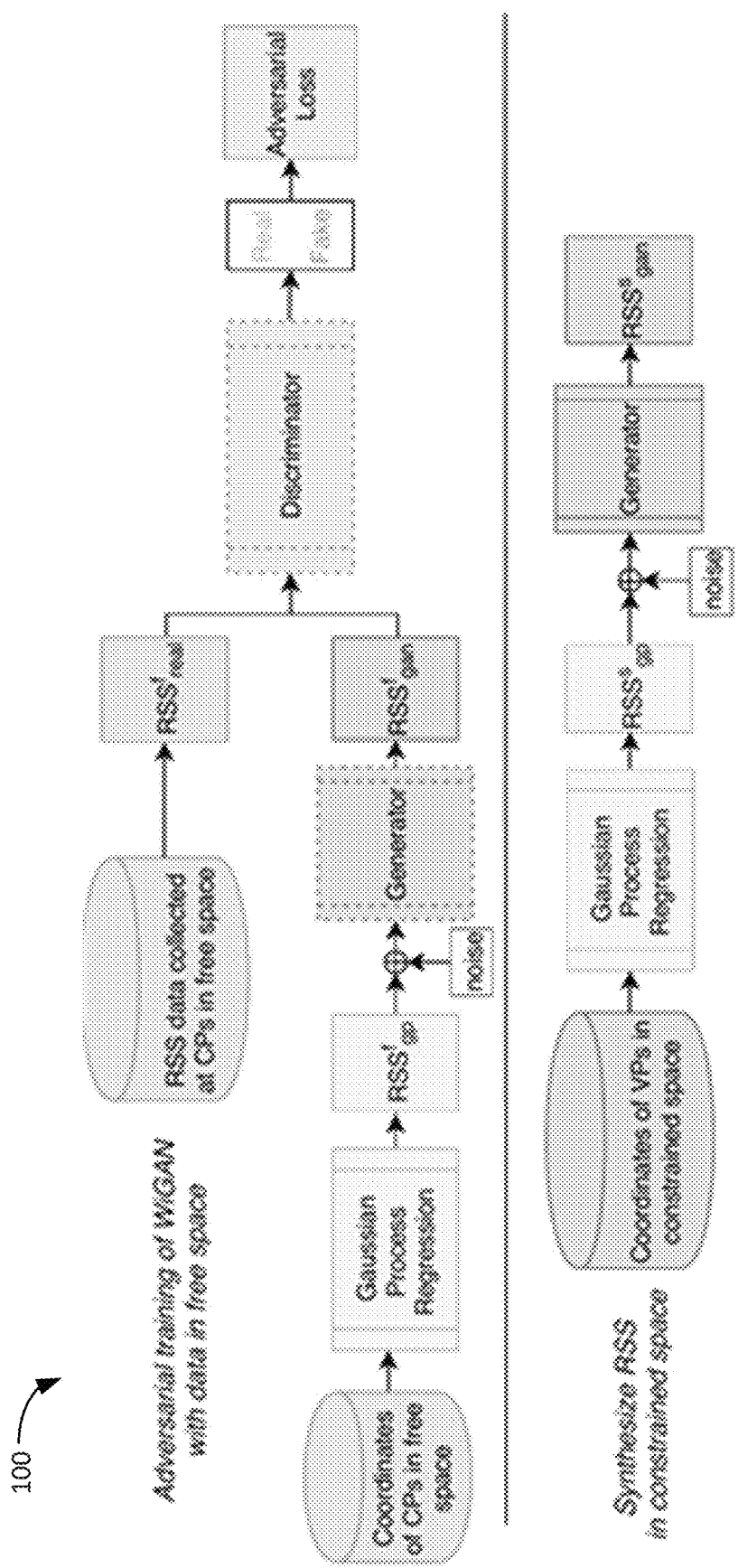
FIG. 1 illustrates an example methodology of a system including a Gaussian process regression (GPR) initialized Wasserstein generative adversarial network (GAN) in accordance with certain implementations of the disclosed technology.

Implementations of the disclosed technology, referred to herein as WiGAN, are generally directed to an automatic fine-grained ratio map construction scheme that is empowered by a Gaussian process regression (GPR) initialized Wasserstein generative adversarial network (GAN). Any environment can be divided into two categories: free space where a signal measurement sensor can access freely, and constrained space where the sensor cannot access or the noise level of its measurement is high. The WiGAN may firstly establish a GPR model using the real RSS readings collected by the sensor in the free space. Then, the outputs of the GPR may be adopted as the input of GAN's generator.

A training objective of the GAN may be to model the irregular RSS distributions in the environment, and generate realistic RSS data in the constrained space that have not been manually site surveyed. The trained GPR model may be used to generate coarse RSS estimations at those virtual points within the constrained space. Then, by using them as the input for the GAN's generator, the fine-grained RSS values at points inside the area of interest may be estimated from the generator. The WiGAN can be leveraged to generate radio map for any suitable RF signals, e.g., GPS, LTE, BLE, and WiFi.

In certain implementations, WiGAN can be leveraged to generate a radio map for any RF signals (e.g., GPS, LTE, BLE). WiGAN may be used to construct a fine-grained WiFi radio map automatically in a complex indoor environment. The RSS distribution can be modeled with Gaussian Process Regression (GPR) and fundamentals of Generative Adversarial Network (GAN). After that, WiGAN can construct the fine-grained radio map by way of the GPR initialized Wasserstein generative adversarial network.

Gaussian Process Regression for Coarse RSS Estimation

GPR has been used in many applications, e.g., spatial smoothing, geostatistics, and robotics. Since its nonlinear regression capacity is more suitable to capture the anomalous RSS variations in complex indoor environments than linear signal delay function, researchers have leveraged it to interpolate RSS values and, consequently, reduce the cost for offline calibration.

Consider a mobile robot that collects RSS values from p access points (APs) at n calibration points in the free space. The spatial map and radio map dataset includes n pairs of $(l_i^f, S_i^f)_{i=1}^n$ where $l_i^f = (x_i, y_i)$ is the two-dimensional coordinates of a calibration points, and $S_i^f$ is the RSS values from p APs at location $l_i^f$. The relationship between the spatial space L and the signal space S can be modeled as:

$$S = f(l) + \tilde{\sigma}$$

where $\tilde{\sigma}$ is independent and identically distributed (i.i.d.) additive zero-mean Gaussian noise with variance $\sigma_\sigma^2$. The latent function $f(l)$ can be modeled as a Gaussian Process (GP):

$$S \sim GP(m(l), k(l, l'))$$

where m(•) and k(•,•) represent the mean and covariance function of GP respectively. For RSS radio map construction, the mean function m(•) can be modeled as a Log-Distance path loss model and a quadratic polynomial function. The quadratic polynomial function can be utilized as the mean function:

$$m(l_i) = \beta_0 + \beta_1 x_i + \beta_2 y_i + \beta_3 x_i^2 + \beta_4 y_i^2 + \beta_5 x_i y_i,$$

where $(x_i, y_i)$ are the coordinates of location $l_i$, and the squared exponential kernel function as the covariance function:

$$k(l, l') = \sigma_f^2 \exp\left[\frac{-\|l - l'\|^2}{2r^2}\right] + \sigma_\delta^2 \delta(l, l'),$$

where $\sigma_f^2$, r and $\delta(\bullet, \bullet)$ denote the signal variance, the scale parameter, and the Kronecker delta function, respectively.

The Gaussian process regression model (GP) can be used to provide a coarse estimation of RSS values $\{\hat{S}_j^s\}_{j=1}^m \in \hat{S}_{GP}^s$ from p APs at m locations $\{l_j^s\}_{j=1}^m \in L^s$ locations in constrained space. At each location $l_j^s$, the RSS value from each AP can be estimated according to the posterior mean of GP:

$$s_j^s = m(l_j^s) + K(l_j^s, L^f)[K(L^f, L^f) + \sigma_\sigma^2 I]^{-1}(S^f - m(L^f)).$$

Generative Adversarial Network (GAN)

A GAN as described herein generally includes two parts: a generative model G and a discriminative model D. By taking a noisy vector $z \sim P_n(z)$ (e.g., Gaussian or uniformly distributed) as the input, the objective of the generator G is to synthesize data ($\hat{x}$) resembling real data distribution, $x \sim P_r(x)$. The discriminator D can randomly sample a batch of real and synthesized data and distinguish them by maximizing the probabilities that x is real and $\hat{x}$ is fake. The loss function of GAN can be formulated as:

$$\min_G \max_D E_{x \sim P_r(x)}[\log D(x)] + E_{z \sim P_n(z)}[\log(1 - D(G(z)))]$$

where G and D can be trained jointly on the loss function in a minimum-maximum fashion using backpropagation, which updates D to maximize the likelihood of the discriminator being correct while updating G to generate realistic data to fool the discriminator. One potential issue with the GAN is the vanishing gradients for the generator. Thus, WiGAN can be used to minimize the Wasserstein distance between the distributions instead of the original Jensen-Shannon divergence in the settings of GAN.

The GAN generally obtains groundbreaking results for the generation of realistic images. A few studies apply GAN on RF signal generations, e.g., audio signal and EEG signals. A Tensor Generative Adversarial Network (TGAN) can be used to generate a representation of RSS values with super-resolution for indoor localization.

WiGAN

WiGAN may generate realistic and fine-grained RSS values in constrained space (e.g., on a table of cubicles, conference rooms, and personal offices) using its generator G with the output of the GPR model GP learned using the data collected in free space (e.g., corridors, open space). The potential issue is more challenging since RSS values are to be estimated at new coordinates in order to construct a fine-grained radio map in the entire environment, while conventional methods focus on generating more RSS samples at the coordinates where real RSS measurements are already available.

An example of using WiGAN for radio map construction and adaptation is presented in Algorithm 1 and illustrated by FIG. 1. This example includes four primary steps.

Step 1: a GPR model GP is constructed using the RSS values of p APs collected at n calibration points (CPs) in the free space as well as their 2D coordinates ($S^f, l^f$).

Step 2: this step of WiGAN aims to train its generator G and discriminator D with ($S^f, \hat{S}_{GP}^f$). In WiGAN, instead of using a noisy vector $z \sim P_n(z)$ as the input for G in GAN, the system concatenates the coarse RSS estimation from GP together with the noisy vector as $\hat{S}_{GP}^f$ and uses them as the inputs for G. In this manner, WiGAN inherits the nonlinear relations between the spatial and radio space captured by GP and has better initialization for adversarial training than using the random noisy vector. The inputs for the discriminator D are randomly sampled batches of real RSS data $S^f \sim P_r(S^f)$ and synthesized RSS data $\hat{S}_{GP}^f \sim P_n(\hat{S}_{GP}^f)$ in the free space. The loss function of WiGAN may be formulated as:

$$\min_G \max_D E_{S^f \sim P_r(S^f)}[\log D(S^f)] + E_{\hat{S}_{GP}^f \sim P_n(\hat{S}_{GP}^f)}[\log(1 - D(G(\hat{S}_{GP}^f)))].$$

Backprogration can be used to optimize the parameters of G and D in the min-max loss function. A primary objective of G may be to generate realistic RSS data to fool D, while D may aim to maximize the likelihood of being correct of the determination of whether the data is real or fake. The Wasserstein distance can be adopted as the metric to measure the discrepancy between the two data distributions to improve the training stability of WiGAN.

Step 3: to estimate the RSS values at virtual points (VPs) in the constrained space, a coarse estimation $\hat{S}_{GP}^f$ can be provided via the GP model established in Step 1. Suppose there are m testing point in the constrained space, the coarse RSS value of each AP at each testing point (j=1, ..., m) may be calculated as:

$$\hat{S}_{GP_j}^s = m(l_j^s) + K(l_j^s, L^f)[K(L^f, L^f) + \sigma_\epsilon^2 I]^{-1}(S^f - m(L^f)).$$

Step 4: the coarse RSS estimations obtained $\hat{S}_{GP}^f$ by Step 3 together with a small random noisy vector may be utilized as the input for the generator G of WiGAN. The fine-grained RSS estimations at VPs in the constrained space may be calculated using the generator G trained in Step 2 as:

$$\hat{S}^s = G(\hat{S}_{GP}^f).$$

In this manner, a fine-grained radio map that covers both free and constrained space may be established by WiGAN with higher spatial granularity.

Algorithm 1 below further describes the radio map construction and adaptation.

---

Algorithm 1 WiGAN: radio map construction & adaptation

Input: p - Number of APs
n - Number of calibration points in free space
$l^f$ - 2D coordinates of calibration points in free space
$S^f$ - RSS data at calibration points in free space
m - Number of virtual points in constrained space
$l^s$ - 2D coordinates of virtual points in constrained space Algorithm 1 WiGAN: radio map construction & adaptation Output:
$\hat{S}^s$ - Estimated RSS at virtual points in constrained space
Step 1 Construct Gaussian process regression model ($\mathcal{GP}$) via data collected in free space
$$S^f \sim \mathcal{GP}(m(l^f), k(l^f, l^f))$$
Step 2 Train generator $\mathcal{G}$ and discriminator $\mathcal{D}$ of WiGAN and use coarse RSS estimation by $\mathcal{GP}$ as input for $\mathcal{G}$
$$\min_{\mathcal{G}} \max_{\mathcal{D}} \mathbb{E}_{S^f \sim P_r(S^f)}\left[\log \mathcal{D}(S^f)\right] + \mathbb{E}_{\hat{S}_{\mathcal{GP}}^f \sim P_n(\hat{S}_{\mathcal{GP}}^f)}\left[\log\left(1 - \mathcal{D}(\mathcal{G}(\hat{S}_{\mathcal{GP}}^f))\right)\right]$$
Step 3 Estimate coarse RSS value of each AP at each virtual point (j = 1, . . . , m) in constrained space via $\mathcal{GP}$
$$\hat{S}_{\mathcal{GP}_j}^s = m(l_j^s) + K(l_j^s, L^f)[K(L^f, L^f) + \sigma_\epsilon^2 I]^{-1}(S^f - m(L^f))$$
Step 4 Estimate fine-grained RSS value at virtual points in constrained space via the generator $\mathcal{G}$ of WiGAN
$$\hat{S}^s = \mathcal{G}(\hat{S}_{\mathcal{GP}}^s)$$
return $\hat{S}^s$

---

Experimental Setup

Figure 2:
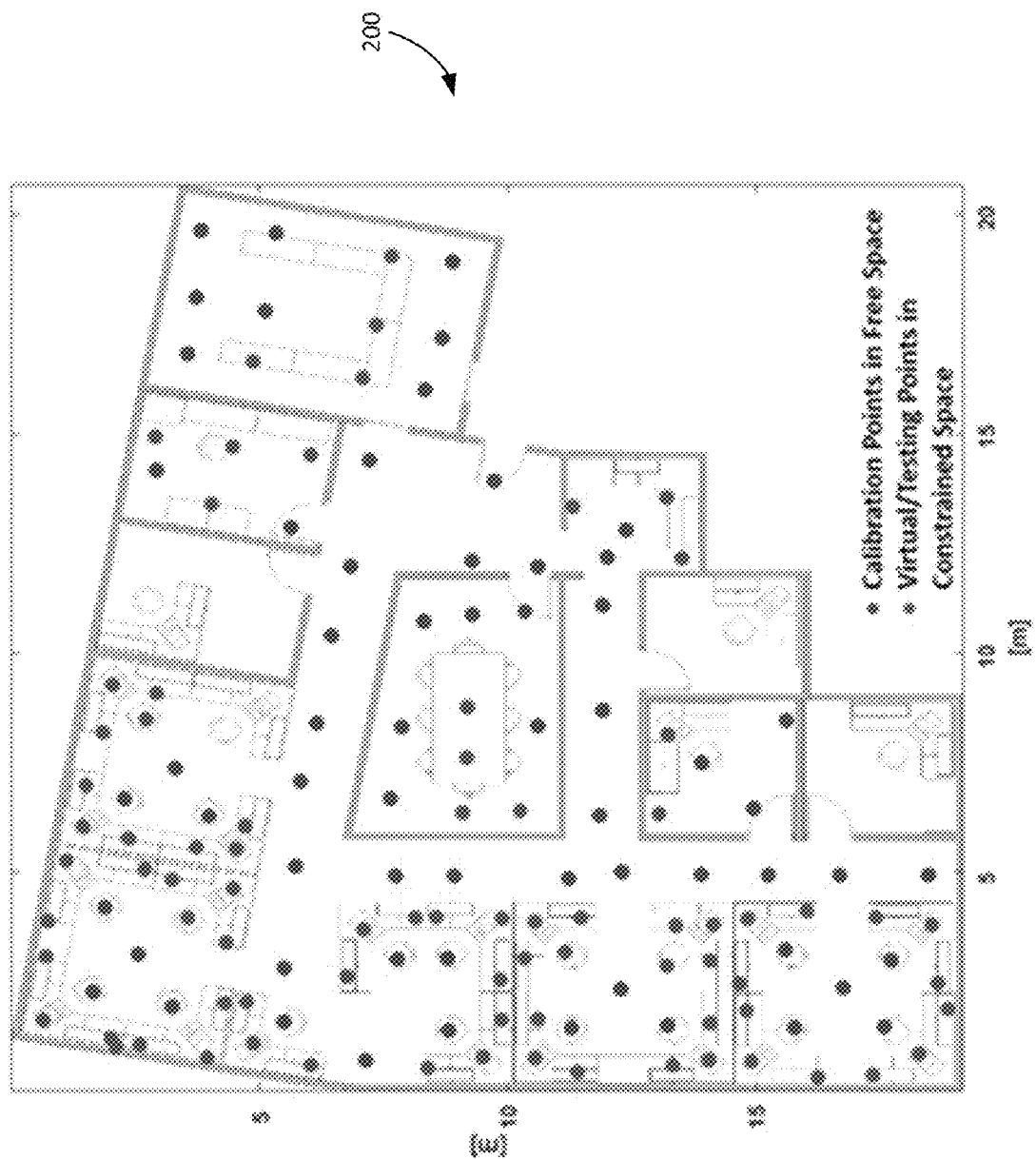
FIG. 2 illustrates an example of a layout of calibration points in free space and virtual/testing points in constrained space in accordance with certain implementations of the disclosed technology.

To evaluate the radio map construction and adaptation performance of WiGAN, extensive experiments were conducted in a 700 m² multi-functional office. As depicted in FIG. 2, the office 200 was composed of 1 lab, 1 pantry area, 2 conference rooms, 4 personal offices, and an open space office with 20 cubicles. Nine TP-LINK N750 routers were deployed to establish the WiFi sensing network of WinIPS. By upgrading the software of these routers, they were able to detect existing WiFi traffic, extract RSS values of MDs with their corresponding MAC addresses from the data packets, and forward this data to the WinIPS back-end server. The back-end server received and parsed the data from routers, and stored the RSS measurements in a MySQL database for WiGAN evaluation.

An MD (here, an iPhone 7) was placed on a mobile robot (here, Turtlebot 2) to collect the RSS values of the MD automatically in the free space (e.g., corridors, open space) at 62 calibration points (highlighted as blue dots in FIG. 2). RSS values of the MD were manually collected at 80 virtual/testing points (highlighted as red dots in FIG. 2) in the constrained space (e.g., on the table of cubicles, conference rooms, and personal offices), which served as the ground truth to validate the performance of WiGAN.

Fifty RSS samples were collected in each calibration point. The coordinates of the calibration points and the mean RSS value collected on each point $(l_i, S_i)_{i=1}^f$ were utilized to construct the Gaussian process regression model. Then, the synthesized RSS samples and the real RSS values collected on the calibration points were used to train the generator and discriminator of WiGAN in the min-max manner as illustrated in FIG. 1. After that, the RSS values at the testing points were estimated by feeding their coordinates to the Gaussian process regression model and the generator.

Evaluation on RSS Estimation Accuracy

Figure 3:
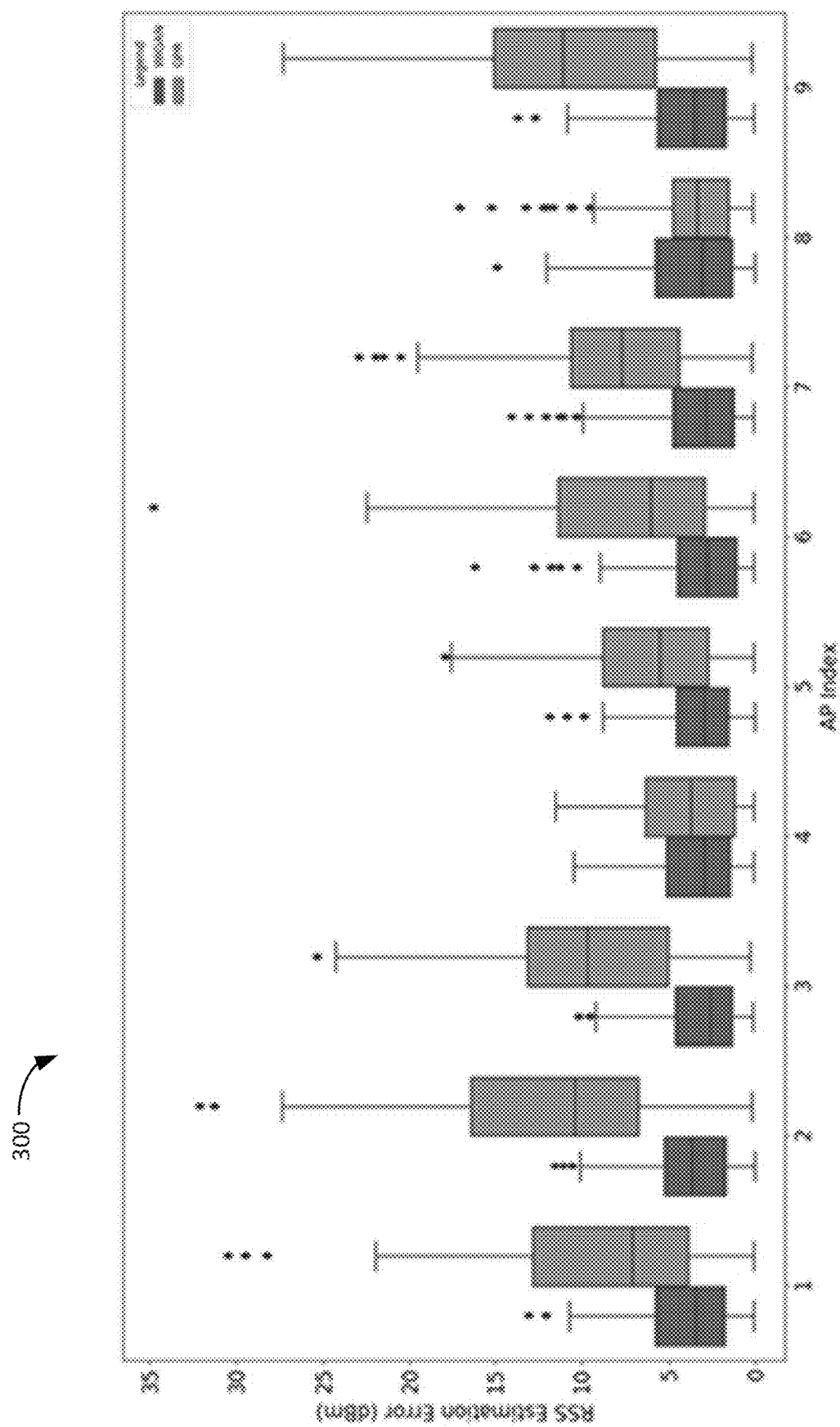
FIG. 3 illustrates an example of a boxplot of receiving signal strength (RSS) estimation errors of nine access points (APs) by way of the WiGAN and GPR in accordance with certain implementations of the disclosed technology.
Figure 4:
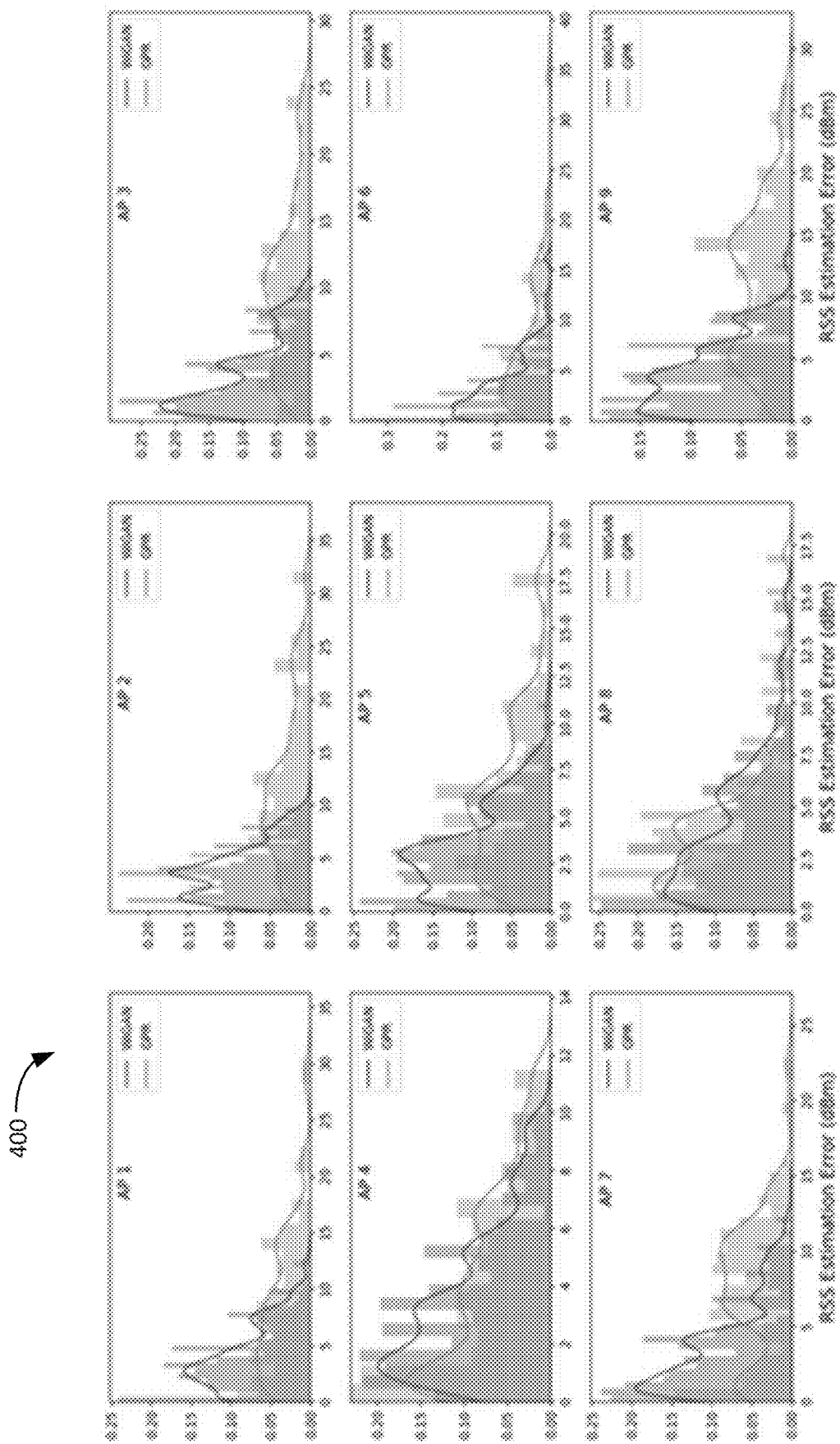
FIG. 4 illustrates an example of a distribution of the RSS estimation errors of FIG. 3.

The mean ($\bar{e}_{RSS}$) and standard deviation ($\sigma_{RSS}$) of RSS estimation errors of WiGAN were calculated with respect to the observed RSS measurements at the 80 testing points in the constrained space. The mean RSS estimation error of WiGAN (80×50 samples) was 3.56 dBm with the standard deviation of 2.7 dBm on average. Its detailed performance at each AP was compared with GPR. As demonstrated in Table 1 ($\bar{e}_{RSS}$) and Table 2 ($\sigma_{RSS}$), WiGAN reduced the mean error by 54.5% and the standard deviation of RSS error by 49.5% compared to GPR on average, which achieves tremendous performance gain. Statistical measurements of the two methods, including boxplot and histogram of RSS estimation error distribution of the 9 APs are illustrated by FIG. 3 and FIG. 4, respectively. As shown in the visual depiction 300 of FIG. 3, the 75$^{th}$ percentile of error for WiGAN at each AP was lower than 6 dBm, while those of GPR was much larger. The same conclusion can be drawn from the distribution of error as illustrated by the visual depictions 400 of FIG. 4.

TABLE 1

Comparison of RSS estimation errors - mean $\bar{e}_{RSS}$ (dBm)

| Method | AP1 | AP2 | AP3 | AP4 | AP5 | AP6 | AP7 | AP8 | AP9 | Average |
|---|---|---|---|---|---|---|---|---|---|---|
| GPR | 8.47 | 11.73 | 10.03 | 4.00 | 6.18 | 7.48 | 7.57 | 3.86 | 11.12 | 7.82 |
| WiGAN | 3.91 | 3.77 | 3.33 | 3.39 | 3.26 | 3.39 | 3.52 | 3.73 | 3.76 | 3.56 |

TABLE 2

Comparison of RSS estimation errors - standard deviation $\sigma_{RSS}$ (dBm)

| Method | AP1 | AP2 | AP3 | AP4 | AP5 | AP6 | AP7 | AP8 | AP9 | Average |
|---|---|---|---|---|---|---|---|---|---|---|
| GPR | 6.37 | 7.57 | 6.21 | 3.12 | 4.25 | 6.24 | 4.65 | 3.35 | 6.40 | 5.35 |
| WiGAN | 2.80 | 2.42 | 2.59 | 2.46 | 2.29 | 3.09 | 2.89 | 3.07 | 2.73 | 2.70 |

Evaluation on Localization Accuracy

Since an objective of constructing and updating a fine-grained WiFi radio map is to improve the localization performance, the localization accuracy of the IPS was evaluated when WiGAN was utilized. Thirty testing points were randomly selected in the entire office. STI-WKNN was adopted as the localization algorithm together with different radio maps to estimate locations at these testing points and the localization errors (Euclidean distance) were calculated with respect to the physical locations (ground truth). The performance of WiGAN was compared with three radio maps, real RSS data collected by robot at the calibration points in free space (lower baseline), real RSS data collected by robot+generated RSS values via GPR, real RSS data collected by robot+generated RSS values via WiGAN, and real RSS data collected at calibration points in constrained space and free space (manually collected radio map).

Table 3. Comparison of localization errors in terms of mean ($\bar{e}_{LA}$) and standard deviation ($\sigma_{LA}$)

| Method | $\bar{e}_{LA}$ (m) | $\sigma_{LA}$ (m) |
|---|---|---|
| Lower Baseline | 3.87 | 1.64 |
| GPR | 3.25 | 1.53 |
| WiGAN | 1.98 | 0.81 |
| Manual Site Survey | 1.79 | 0.73 |

Table 3 above compares the localization errors in terms of mean ($\bar{e}_{LA}$) and standard deviation ($\sigma_{LA}$) of the four methods. As presented in Table 3, the use of RSS data collected by the robot in free space only is the worst (3.87 m) and cannot meet the localization accuracy requirement for many LBS applications. Both WiGAN and GPR enhance the accuracy over the lower baseline, which validates the necessity of generating RSS data in constrained space. A noteworthy observation from Table 3 is that WiGAN reduces the localization error by 33.5% over GPR, which indicates higher RSS estimation accuracy leading to higher localization accuracy. Another noteworthy point is the mean error of WiGAN reaching 1.98 m, which is only 0.2% lower than the manually collected radio map (upper-baseline).

The disclosed aspects may be implemented, in some cases, in hardware, firmware, software, or any combination thereof. The disclosed aspects may also be implemented as instructions carried by or stored on one or more or non-transitory computer-readable media, which may be read and executed by one or more processors. Such instructions may be referred to as a computer program product. Computer-readable media, as discussed herein, means any media that can be accessed by a computing device. By way of example, and not limitation, computer-readable media may comprise computer storage media and communication media.

Additionally, this written description makes reference to particular features. It is to be understood that the disclosure in this specification includes all possible combinations of those particular features. For example, where a particular feature is disclosed in the context of a particular aspect, that feature can also be used, to the extent possible, in the context of other aspects.

Also, when reference is made in this application to a method having two or more defined steps or operations, the defined steps or operations can be carried out in any order or simultaneously, unless the context excludes those possibilities.

Furthermore, the term "comprises" and its grammatical equivalents are used in this disclosure to mean that other components, features, steps, processes, operations, etc. are optionally present. For example, an article "comprising" or "which comprises" components A, B, and C can contain only components A, B, and C, or it can contain components A, B, and C along with one or more other components.

Also, directions such as "right" and "left" are used for convenience and in reference to the diagrams provided in figures. But the disclosed subject matter may have a number of orientations in actual use or in different implementations. Thus, a feature that is vertical, horizontal, to the right, or to the left in the figures may not have that same orientation or direction in all implementations.

Having described and illustrated the principles of the invention with reference to illustrated embodiments, it will be recognized that the illustrated embodiments may be modified in arrangement and detail without departing from such principles, and may be combined in any desired manner And although the foregoing discussion has focused on particular embodiments, other configurations are contemplated.

In particular, even though expressions such as "according to an embodiment of the invention" or the like are used herein, these phrases are meant to generally reference embodiment possibilities, and are not intended to limit the invention to particular embodiment configurations. As used herein, these terms may reference the same or different embodiments that are combinable into other embodiments.

Although specific embodiments of the invention have been illustrated and described for purposes of illustration, it will be understood that various modifications may be made without departing from the spirit and scope of the invention. Accordingly, the invention should not be limited except as by the appended.

What is claimed is:

1. An automatic wireless fine-grained ratio map construction and adaptation system, comprising:
   a sensor configured to collect real wireless received signal strength (RSS) measurements in a free space;
   a processor configured to construct a Gaussian process regression (GPR) model based at least in part on the real wireless RSS measurements collected by the sensor in the free space to provide coarse RSS estimation in a constrained space; and
   a generator of a generative adversarial network (GAN) configured to provide fine-grained RSS estimation in the constrained space by using an output of the GPR as an input for the generator of the GAN.

2. The system of claim 1, wherein the system is further configured to model the irregular RSS distributions in complex indoor environments.

3. The system of claim 2, wherein the system is further configured to generate realistic RSS data in the constrained space that has not been manually site surveyed.

4. The system of claim 1, wherein the environment can be classified as the free space where the sensor can access freely.

5. The system of claim 1, wherein the environment can be classified as the constrained space where the sensor cannot access easily or where the noise of its measurement is high.

6. The system of claim 1, wherein the processor is configured to construct the GPR model by using the RSS measurements at calibration points as well as their two-dimensional coordinates collected by the sensor in the free space to capture anomalous RSS variations on a rough level.

7. The system of claim 6, wherein the processor is further configured to construct the GPR model by providing a coarse RSS estimation at the calibration points and adopting them as the input for the generator of the GAN instead of random noise.

8. The system of claim 7, wherein the nonlinear relations between the spatial and radio space captured by the GPR can be inherited by the GAN.

9. The system of claim 1, wherein the generative adversarial network (GAN) is configured to reveal the irregular RSS distribution in an environment that is not explored by the GPR.

10. The system of claim 1, wherein the generative adversarial network (GAN) is configured to synthesize realistic RSS data to fool a discriminator of the GAN while the discriminator of the GAN tries to distinguish whether the data is real or fake.

11. The system of claim 1, wherein providing the fine-grained RSS estimation comprises leveraging the GPR model to generate coarse estimations and use them as the input for the generator of the GAN.

12. The system of claim 11, wherein the output of the generator of the GAN is the fine-grained RSS estimation.

13. A method, comprising:
   a sensor of an automatic wireless fine-grained ratio map construction and adaptation system collecting real wireless received signal strength (RSS) measurements in a free space;
   a processor of the automatic wireless fine-grained ratio map construction and adaptation system constructing a Gaussian process regression (GPR) model based at least in part on the real wireless RSS measurements collected by the sensor in the free space to provide coarse RSS estimation in a constrained space; and
   a generator of a generative adversarial network (GAN) of the automatic wireless fine-grained ratio map construction and adaptation system providing fine-grained RSS estimation in the constrained space by using an output of the GPR as an input for the generator of the GAN.

14. The method of claim 13, further comprising modeling the irregular RSS distributions in complex indoor environments.

15. The method of claim 14, further comprising generating realistic RSS data in the constrained space that has not been manually site surveyed.

16. The method of claim 13, wherein the processor constructing the GPR model includes the processor using the RSS measurements at calibration points as well as their two-dimensional coordinates collected by the sensor in the free space to capture anomalous RSS variations on a rough level.

17. The method of claim 16, further comprising the processor constructing the GPR model by providing a coarse RSS estimation at the calibration points and adopting them as the input for the generator of the GAN instead of random noise.

18. The method of claim 13, further comprising the GAN revealing the irregular RSS distribution in an environment that is not explored by the GPR.

19. The method of claim 13, further comprising the GAN synthesizing realistic RSS data to fool a discriminator of the GAN while the discriminator of the GAN tries to distinguish whether the data is real or fake.

20. The method of claim 13, wherein the generator providing the fine-grained RSS estimation comprises the generator leveraging the GPR model to generate coarse estimations and use them as the input for the generator of the GAN.

* * * * *